United States Patent [19]

Tarlow

[11] Patent Number: 5,013,158

[45] Date of Patent: May 7, 1991

[54] SELF STIRRING VESSEL

[76] Inventor: Kenneth A. Tarlow, 138 Waterview, Playa del Rey, Calif. 90293

[21] Appl. No.: 489,496

[22] Filed: Mar. 7, 1990

Related U.S. Application Data

[63] Continuation-in-part of Ser. No. 250,901, Sep. 29, 1988, abandoned.

[51] Int. Cl.⁵ .......................... A47J 27/00; B01F 7/20
[52] U.S. Cl. ...................... 366/251; 99/348; 366/282
[58] Field of Search .............. 366/242, 243, 244, 245, 366/246, 247, 248, 249, 250, 251, 252, 253, 254, 281, 282, 283, 284, 309, 312, 325, 328, 330, 343, 65, 97, 98, 142, 329; 99/348, 325, 327, 332, 342, 344, 486, 328, 329 R, 333; 416/231 R, 231 A, 231 B, 224, 223 R, 179, 189 R, 189 B; 310/83, 85, 89

[56] References Cited

U.S. PATENT DOCUMENTS

| 869,058 | 10/1907 | Callan | 310/83 X |
|---|---|---|---|
| 1,198,529 | 9/1916 | Dowling | 366/252 X |
| 1,200,301 | 10/1916 | Bigelow | 99/348 X |
| 2,042,176 | 5/1936 | Hausman | 366/251 |
| 2,209,287 | 7/1940 | Simpson | 310/83 X |
| 2,289,645 | 7/1942 | Geistert | 366/243 X |
| 2,376,722 | 5/1945 | Podell | 366/282 |
| 3,064,950 | 11/1962 | DeLaria | 366/325 X |
| 3,112,917 | 12/1963 | Woerner | 99/348 X |
| 3,357,685 | 12/1967 | Stephens | 366/282 |
| 3,614,262 | 10/1971 | Lutz | 416/224 |
| 3,691,938 | 9/1972 | Nichols | 366/325 X |
| 3,697,053 | 10/1972 | Will | 366/343 |
| 3,783,770 | 1/1974 | Aries | 366/309 X |
| 4,151,792 | 5/1979 | Nearhood | 366/312 X |
| 4,332,485 | 6/1982 | Woodman | 366/142 |
| 4,339,992 | 7/1982 | Kurland | 366/343 X |
| 4,417,506 | 11/1983 | Herbst et al. | 366/205 X |
| 4,536,688 | 8/1985 | Roger | 318/305 X |
| 4,576,089 | 3/1986 | Chauvin | 99/348 X |

FOREIGN PATENT DOCUMENTS

| 3045308 | 7/1982 | Fed. Rep. of Germany | 99/348 |
|---|---|---|---|
| 1325170 | 3/1963 | France | 366/251 |
| 2459009 | 1/1981 | France | 99/348 |
| 70584 | 10/1927 | Sweden | 366/249 |
| 2128494 | 5/1984 | United Kingdom | 366/343 |
| 2129322 | 5/1984 | United Kingdom | 366/282 |
| 234607 | 6/1925 | United Kingdom | 366/247 |

Primary Examiner—Harvey C. Hornsby
Assistant Examiner—Scott J. Haugland
Attorney, Agent, or Firm—Poms, Smith, Lande & Rose

[57] ABSTRACT

A self stirring vessel having a container for holding liquids, a vaned stirring device mounted internally of the container and a timer actuated motor coupled to the stirring device. In this manner, the vessel can be automatically continually stirred while simmering without need for manual attention.

11 Claims, 2 Drawing Sheets

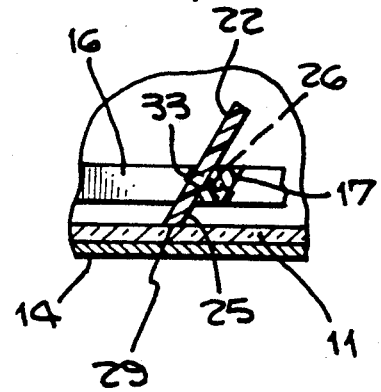
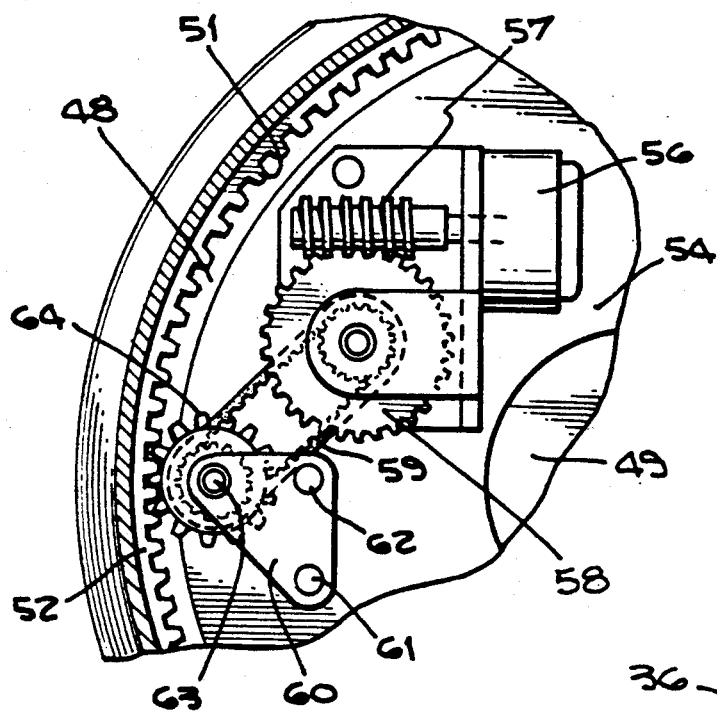
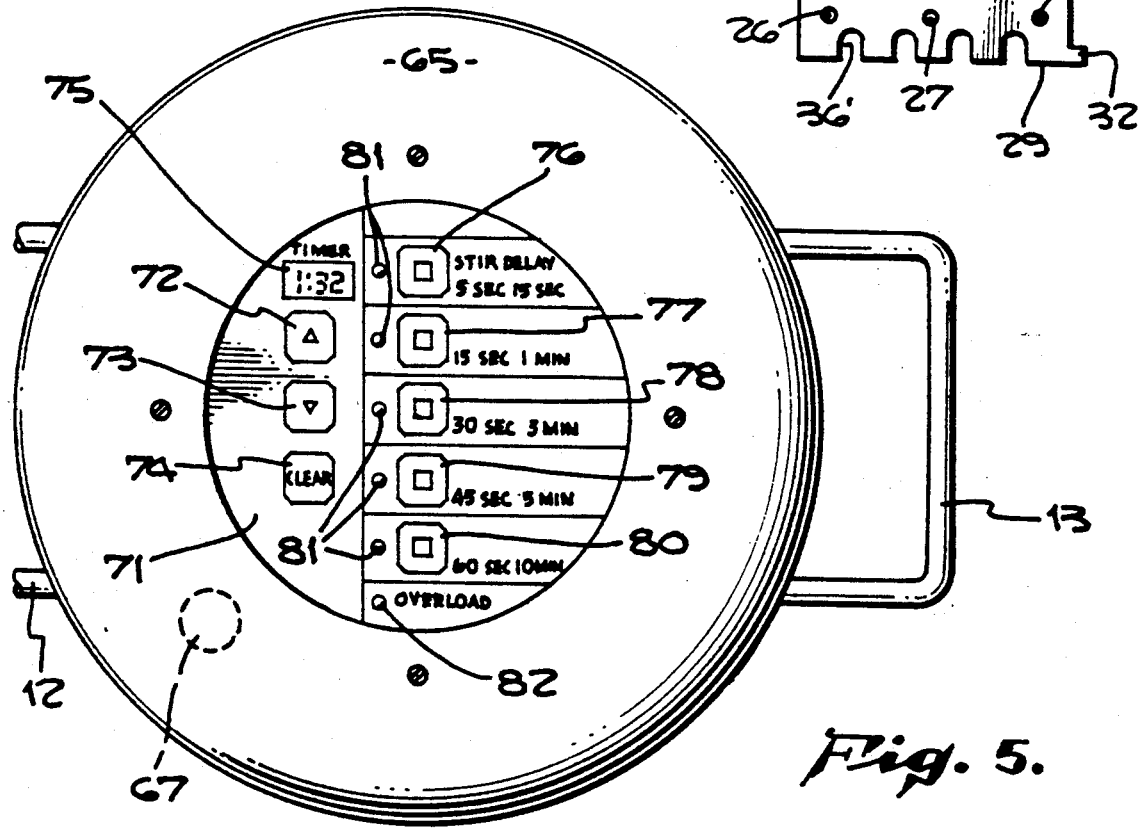

SELF STIRRING VESSEL

RELATIONSHIP TO OTHER APPLICATIONS

This application is a continuation-in-part of application Ser. No. 07/250,901, filed Sept. 29, 1988, now abandoned.

BACKGROUND OF THE INVENTION

1. Field of the Invention

The invention relates to self stirring vessels; and, more particularly, to a vessel having automatic timed stirring means.

2. Description of the Prior Art

Self stirring vessels are well known in the prior art. In U.S. Pat. No. 3,783,770 to Aries, a device is disclosed having a lid 1 having a shaft 3 with a blade 4. Obviously, the basic concept is old. Note in FIG. 4 that it is all one unit. There is a modification of the blades in FIG. 5. The shaft in FIG. 5 is detachable from the lid by a lip 41 snap locking into recess 42. The motor is battery operated.

In Will Pat. No. 3,697,053, a battery operated stirring device is disclosed but the blades 21, 25 do not sweep the sides of the vessel. In Nichols U.S. Pat. No. 3,691,938, there are a plurality of fingers with a U-shaped member 26 following the contour of the vessel. In Chauvin, U.S. Pat. No. 4,576,086 pivotable arms 1 are shown. In Stephens, U.S. Pat. No. 3,357,685, a chuck 28 interconnects the shaft sections 27a, 27. It is also battery operated.

Woerner U.S. Pat. No. 3,112,917 shows a pressure actuated motor in an automatic stirring device. Kurland U.S. Pat. No. 4,339,992 has interchangeable paddles (but not fingers) with a square or rectangular configured socket 52 (FIG. 6) receiving the shaft end 54A therein. Note that Herbst et al U.S. Pat. No. 4,417,506 has a socket 42 receiving an end 48 for actuating blades 16 via motor 34.

Nearhood U.S. Pat. No. 4,151,792 shows a mixer vessel having paddles 124, 132. The Bigelow U.S. Pat. No. 1,200,301 shows a steam operated having blades 25. Finally, Hausman U.S. Pat. No. 2,042,176 shows a device with a motor and a plurality of elongated paddles.

There thus exists a need for a self stirring vessel which automatically stirs the contents of the vessel.

SUMMARY OF THE INVENTION

It is an object of this invention to provide an improved self stirring vessel.

It is a further object of this invention to provide a self stirring vessel which automatically stirs the contents of the vessel in a timed relationship.

It is still further an object of this invention to carry out the foregoing object in a manner protecting the electrical components from the internal heat of the vessel during cooking.

These and other objects are preferably accomplished by providing a self stirring vessel having a container for holding liquids, a vaned stirring device mounted internally of the container and a timer actuated motor coupled to the stirring device. A built-in alarm is provided for indicating when the internal temperature of the vessel exceeds the boiling point of water so that water can be added. In this manner, the vessel can be automatically continually stirred while steaming or simmering without danger of burning or overcooking.

BRIEF DESCRIPTION OF THE DRAWING

FIGS. 2 through 5 are views taken along lines II—II, III—III, IV—IV and V—V, respectively of FIG. 1; and FIG. 6 is a vertical view of a modification of the vanes of FIGS. 1 to 5;

DESCRIPTION OF THE PREFERRED EMBODIMENT

Figure 1:
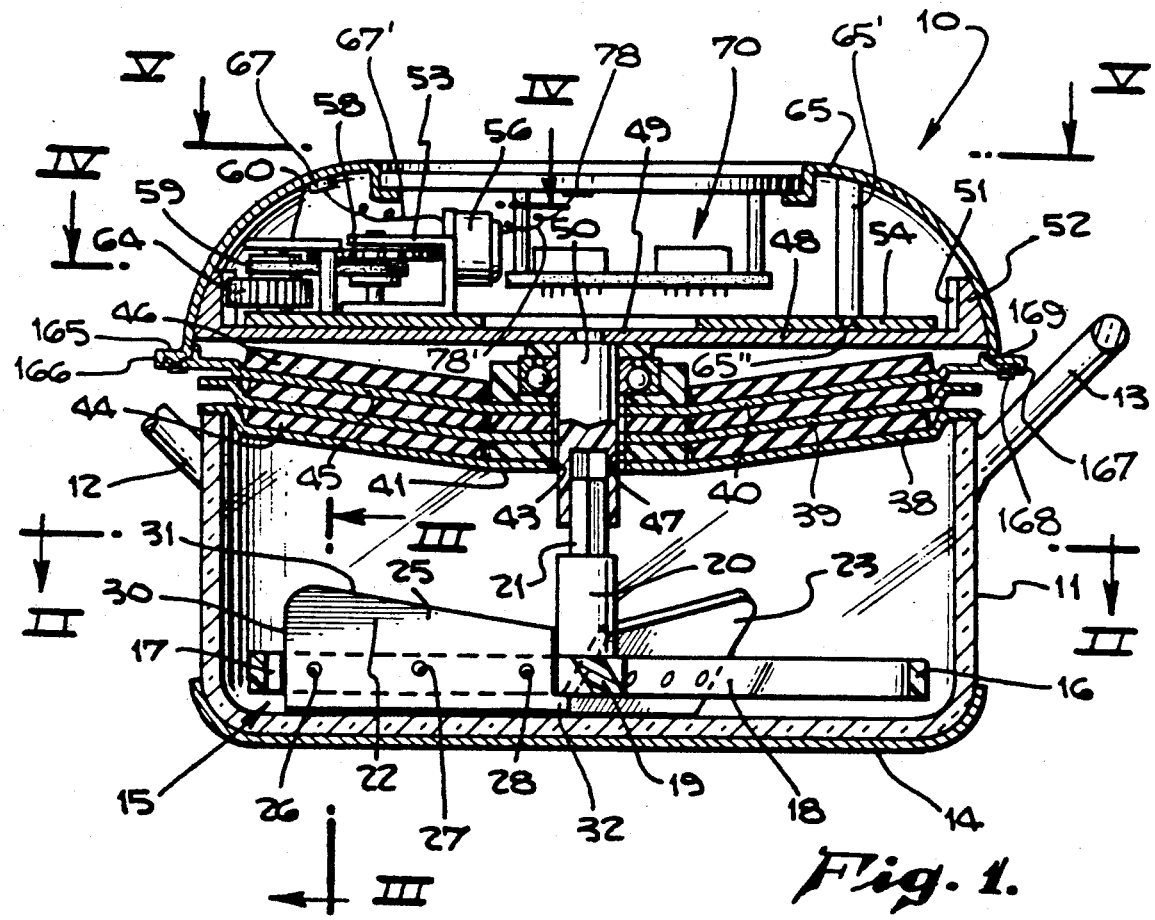
FIG. 1 is an assembled cross-sectional view of a self stirring vessel in accordance with the invention.

Referring now to FIG. 1 of the drawing, a self stirring vessel 10 in accordance with the invention is disclosed. Vessel 10 is comprised of a container 11, preferably of a heat-proof transparent material, such as Pyrex glass with integral handles 12, 13. The bottom may be coated or otherwise be provided with a heat protecting surface 14, such as spun steel coated by a baked enamel finish.

Figure 2:
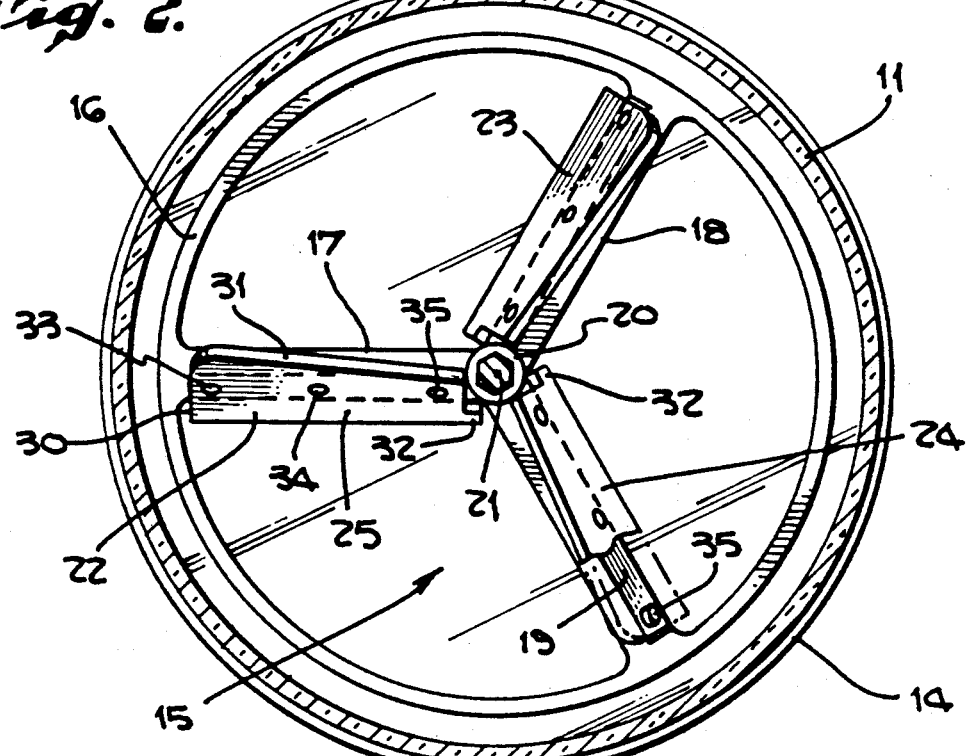

A stirring assembly 15 is disposed internally of container 11 having an annular ring 16 (FIG. 2) with a plurality of integral spaced arms, such as arms 17-19. Arms 17-19 emanate from a central hub 20 which, as seen in FIG. 1, extends vertically upwardly terminating at top in a hexshaped insert 21. A blade or vane is associated with each arm 17-19. Thus, vanes 22-24 are shown fixedly secured to arms 17, respectively. Each vane 22-24 (FIG. 1) has a main body portion 25 with a plurality of apertures or holes, such as holes 26-28, therein (see also FIG. 3). Body portion 25 is flat along its bottom 29 (FIG. 3) and has a vertical front end 30 (FIG. 1) curving at top back down along a tapered surface 31. An extension portion 32 extends rearwardly from each vane 22 to 24. The bottom of extension portion 32 is a continuation of bottom 29. Each arm 17 to 19 is at an angle (see FIG. 2) and provided with a plurality of spaced nubs 33 to 35 (see also FIG. 3) corresponding to the spacing between holes 26 to 28 and generally of the same diameter. In this manner, the vanes can be quickly and easily snap fit onto nubs 33 to 35 (or removed therefrom) with extension portion 32 extending under hub 20 as seen in FIG. 1. Thus, the extension portions 32, and the bottoms 29 of all vanes 22 to 24 result in a complete coverage of the bottom of container 11. The outer diameter of ring 16 is related to the inner diameter of container 11 so there is as much coverage of the bottom of container 11 as possible. As seen in FIG. 1, the vanes 22-24 extend to the inner wall of ring 16 and the angularity of arms 17 to 19 provides an angular relationship to the vanes 22 to 24.

The vanes 22 to 24 can be quickly and easily removed. Thus, depending on the type of stirring desired, the blade may be easily changed under nubs 33 to 35. Thus, as seen in FIG. 6, a modified blade or vane 36 is shown identical to vanes 22 through 24, like numerals referring to like parts, but having a central open area 37 for providing more aeration during stirring. Blade or vane 36 may also have a plurality of open arcuate spaced cutout areas 36' for assisting in stirring and allowing food to pass therethrough. These vanes or blades 36 may be offset from one another and vanes 22 go 24 may also be provided with similar arcuate open spaced cutout areas 36'.

As seen in FIG. 1, provision is made for insulating the electronics required for operating vessel 10 from the intense heat generated in the interior of container 11. Thus, a series of alternating metallic or plastic trays and insulation pads are provided, such as trays 38 to 40, each tray having an inner bowl portion 41, an outer peripheral lip 42 and a central hole 43. Pads 44 to 46 are provided of a suitable material, such as neoprene, each pad being circular and having a central hole 47.

The motive means for vessel 10 is comprised of a ring 48 (FIG. 2) having an inner disk area 49 and a downwardly extending key drive hex socket 50 configured to hex end 21 at the top of hub 20. As particularly seen in FIG. 4, a plurality of spaced teeth 51 are provided about the inner periphery of outer peripheral wall 52 of ring 48. A motor plate 54, configured to the interior of disk area 49, is mounted on top thereof. As seen in FIG. 4, a motor 56 is mounted to a housing 53 mounted on plate 54 having a worm gear 57 therein driving a worm wheel 58 which in turn drives a belt 59. A mounting plate 60 is mounted to plate 54, on posts 61, 62. A shaft 63 mounted to plate 54 has a couples flange 60 to flange 54 and a gear 64 rotatable thereon and in engagement with the teeth 51 of ring 48.

Finally, a top cover 65 (FIG. 5) closes off the top of motor plate 54. As seen in FIG. 5, top cover 65 has an overload sensor 67 (FIG. 5) such as a conventional piezoelectric transducer, provided on the underside of cover 65 for warning when the blades 22 to 24 encounter stiff resistance during stirring. Sensor 67 may be coupled to motor 56 via a suitable electrical conduit 67'. As seen in FIG. 1, cover 65 is secured to plate 54 by a post 65'. Post 65' is glued or otherwise secured to the underside of cover 65 and to plate 54 by screw 65 ''. Cover 65 has a peripheral outwardly extending flange 165 that curves downwardly at edge 166 secured to a peripheral flange 167 of uppermost tray 40 by a screw 168 or the like threaded in suitable threaded aligned apertures in flange 167 and flange 165. An upstanding lip 169 on tray 40 abuts against the inner wall of cover 65. Since cover 65 is coupled to both plate 54 and tray 40, cover 65 does not rotate when vanes 22 to 24 are rotated.

In operation, the type of blade desired is selected and snapped on to arms 17 to 19. The stirring assembly 15 is placed inside of container 11 and the material to be stirred is placed inside of container 11. The trays, pads and ring 48, and plate 54 and cover 65 have been previously assembled as heretofore discussed. This entire assembly is placed over stirring assembly 15 so that shaft hex end 21 enters hex socket 50. The desired stir-delay time is selected via buttons 72 to 74, timer 75 and buttons 76 to 80, as will be discussed and the motor 56 is actuated to begin stirring. The material inside of container 11 is stirred, with the preselected delays, as selected. The sensor 67 indicates by any suitable audible signal when there is an overload. The timer indicates when the stirring is completed. The cover 65 and interconnected parts is removed thereby disengaging the stirring assembly 15. The stirring assembly 15 can now be removed and blades 22 to 24 also removed, if desired, for cleaning or substitution.

A conventional pressure sensitive electronic assembly 70 (FIG. 1) is mounted i the center of cover 65 presenting on the outer surface 71 a plurality of pressure sensitive switches, as an up and down timer setting buttons 72, 73, a "clear" button 74, a timer indicator 75, a stir and delay button 76 and time variations thereon in buttons 77, 78, 79, 80. Indicator lights 81 may be associated with each button 76-80 along with an overload indicator 82. Buttons 76 to 80 are thus used to select the desired stirring time, along with a delay between successive stirring cycles of the time selected, all as is well known in the art. Buttons 72 to 75 timer 75 and buttons 76 to 80 are electrically coupled to motor 56 via conduit 78 which may have individual conduits therein coupled to each button and timer 75 as is well known in the art.

Any suitable materials may be used, such as the family of high temperature plastics, metals, rubber for the belts, etc. The trays 38 to 40 and pads 44 to 46 provide heat insulation and reduce the temperature between the inside of container 11 and the electrical components from 200° F. or so to 110° to 120° F.

It can be seen that there is disclosed an automatic self stirring vessel that eliminates the drudgery required for continual or intermittent stirring of the contents of the vessel. The foregoing is carried out in a quick, economical and efficient manner. The entire vessel is easy and inexpensive to manufacture and assemble.

Although there is disclosed a particular embodiment of the invention, variations thereof may occur to an artisan and the invention is not limited to the disclosure herein but only by the scope of the appended claims.

I claim:

1. A self stirring vessel comprising:

a container having at least an inner bottom wall, an upper peripheral lip and an interconnecting side wall adapted to hold liquids therein;

a stirring assembly having a centrally mounted elongated shaft terminating at the top in a key, said stirring assembly including a blade assembly fixed to the bottom of said shaft and adapted to rest on the inner bottom wall of said container;

stirring assembly actuating means having lip support means for engaging the peripheral lip of said container and resting thereon at the top of said container and also having a key adapted to be coupled to said first-mentioned key and configured with respect thereto for driving relationship therewith when said actuating means is mounted on the peripheral lip of said container, said actuating means further including motive means engaging said second-mentioned key for rotating the same which in turn rotates said first-mentioned key when it is coupled to said second-mentioned key;

said actuating means including heat insulating means between said motive means and the interior of said container for insulating said motive means from the heat given off from the interior of said container when said container is heated, said heat insulating means including a plurality of vertically stacked spaced rigid trays separated by resilient pads; and cover means enclosing said actuating means and electronically coupled thereto and coupled to both the uppermost one of said trays and to said motive means for selectively activating said actuating means.

2. In the vessel of claim 1 wherein a first of said trays of adjacent said second-mentioned key, each of said trays having a central aperture receiving said second-mentioned key therethrough, a central generally concave bowl area opening toward said cover means and an outer peripheral lip, each of said pads being disposed in the bowl area of its respective tray and sandwiched between a succeeding tray with a central aperture receiving said second-mentioned key therethrough.

3. In the vessel of claim 2 wherein said trays are of metallic material and said pads are of neoprene material.

4. In the vessel of claim 2 wherein three said trays and three said pads are provided.

5. In the vessel of either claim 1 or claim 2 including a ring coupled to said second-mentioned key, said ring having an upstanding peripheral wall with a plurality of teeth on the interior thereof, said motive means including a belt coupled to a shaft having a gear thereon, said gear engaging said teeth and meshing therewith.

6. In the vessel of claim 5 wherein said cover means includes pressure sensitive switches thereon for selecting a pre-selected stirring time and non-stirring or delay time when said motive means is actuated.

7. In the vessel of claim 1 including an overload sensor associated with said cover means for indicating when a predetermined amount of resistance is met by said blade assembly during stirring.

8. In the vessel of claim 1 wherein said blade assembly includes an outer peripheral ring with an inner hub forming said centrally mounted elongated shaft, a plurality of spaced arms interconnecting said ring and said hub, each of said arms having a blade mounted thereon.

9. In the vessel of claim 8 wherein at least one of said blades is detachably removable from its respective arm.

10. In the vessel of claim 9 wherein said respective arm has a plurality of spaced nubs thereon receivable in spaced apertures on said one of said blades.

11. In the vessel of claim 8 wherein each of said blades has a flat bottom wall adapted to rest on the bottom wall of said container and an extension portion extending under said hub so that substantially the entire bottom wall of said container encompassed by said ring is scraped by the bottom walls of said blades when said stirring assembly is actuated.

* * * * *